United States Patent [19]
Kitajima et al.

[11] 3,879,510
[45] Apr. 22, 1975

[54] MODIFICATION OF RED BLOOD CELL MEMBRANE WITH POLYISOCYANATES
[75] Inventors: Masao Kitajima; Asaji Kondo, both of Saitama, Japan
[73] Assignee: Fuji Photo Film Co., Ltd., Kanagawa, Japan
[22] Filed: Apr. 11, 1972
[21] Appl. No.: 243,448

Related U.S. Application Data
[63] Continuation-in-part of Ser. No. 834,870, June 19, 1969, abandoned.

[30] Foreign Application Priority Data
June 19, 1968 Japan.............................. 43-42416

[52] U.S. Cl. .......................... 424/3; 195/1.8; 424/1; 424/11; 424/12; 424/101
[51] Int. Cl.... A61k 27/10; G01n 1/28; G01n 33/16
[58] Field of Search ........... 424/3, 12, 101; 195/1.7, 195/1.8

[56] References Cited
UNITED STATES PATENTS
3,639,558   2/1972   Csizmas .............................. 424/12

OTHER PUBLICATIONS
Schick, Chem. Abs., Vol. 55, 1961, pp. 27488-27489.
Todd, Clin. Diag. by Lab. Methods, W. B. Saunders Co., Phila., 1941, 9th Ed. pp. 20, 21, 200-201, 257, 268.
Gynes, Immunochem., Vol. 1, 1964, pp. 43-48.
Kitajima, Bull. The Chem. Soc. of Japan, Vol. 44, 1971, pp. 139-143.
Schick, The J. Biol. Chem., Vol. 236, Sept. 1961, pp. 2477-2485.

Primary Examiner—Albert T. Meyers
Assistant Examiner—A. P. Fagelson
Attorney, Agent, or Firm—Sughrue, Rothwell, Mion, Zinn and Macpeak

[57] ABSTRACT

A method of modifying red blood cells, which comprises:

adding a polyisocyanate in the form of an oil-in-water emulsion consisting essentially of a polyisocyanate and a saline solution to a saline suspension of red blood cells, said emulsion having been prepared at a temperature not exceeding 35°C., and within a period of time approximating 5 minutes.

9 Claims, No Drawings

MODIFICATION OF RED BLOOD CELL MEMBRANE WITH POLYISOCYANATES

CROSS-REFERENCE TO RELATED APPLICATIONS

This application is a continuation-in-part application of Ser. No. 834,870 filed on June 19, 1969, now abandoned, and claims priority based on Japanese Patent Application No. 42416/68, from June 19, 1968.

BACKGROUND OF THE INVENTION

1. Field of the Invention:

The invention relates to the modification of red blood cells. More particularly it relates to a method for the modification of red blood cells by reacting a suspension of red blood cells with an oil-in-water emulsion of a polyisocyanate.

2. Description of the Prior Art:

It is known that red blood cells are deformed and hemolyzed by a slight difference in osmotic pressure, for example, as produced by contact with distilled water, surface active agents, acids, alkali or the like.

SUMMARY OF THE INVENTION

The principal object of this invention is to provide a method for modifying red blood cells, without denaturing the hemoglobin therein by reacting natural red blood cells such as, for example, those from the blood of man, cattle, sheep, pigs, goats, and the like, with an oil-in-water emulsion of a polyisocyanate, whereby the red blood cells are so modified as to preclude hemolyzation, even in the presence of a hypotonic solution.

The present invention is based on the discovery that some components of the red blood cell membrane react rapidly and selectively with an oil-in-water emulsion of polyisocyanate to form a reinforced membrane.

DETAILED DESCRIPTION OF THE INVENTION

In preparing the modified red blood cells of the present invention a dispersion of red blood cells in an isotonic or hypertonic saline solution (for example, 0.15 M saline), is initially prepared. Separately, a liquid polyisocyanate dissolved in a suitable organic solvent is dispersed in an isotonic solution to form an oil-in-water emulsion. The emulsion is then added to the dispersion of red blood cells, thus initiating modification. This reaction is basically carried out in a heterogeneous system; that is, the red blood cell dispersion is reacted with the oil-in-water polyisocyanate emulsion.

Subsequently, centrifugal separation permits the modified red blood cells to precipitate to the lower layer of the red blood cell/oil-in-water emulsion and find particles of polyisocyanate formed by reaction of polyisocyanate with water are deposited thereon. When the polyisocyanate is in the form of an organic solvent solution thereof, liquid droplets containing unreacted polyisocyanate form an uppermost layer on the water layer. The red blood cells deposited as the lowermost layer may be readily redispersed in water.

In forming the liquid polyisocyanate emulsion, a liquid polyisocyanate is directly emulsified in an isomatic saline solution or a solution of the polyisocyanate in a water-immiscible organic solvent is emulsified in an isotonic saline solution. The former system is preferred. Emulsification may be conducted in any manner known to the art, for example, via sonicator, homogenizer or homoblender. However, it is necessary to carry out emulsification within a short term span (normally within about 5 minutes), and at low temperature (preferably not higher than 35°C.). The size of the droplets in the dispersion phase (liquid in the form of droplets) should be as small as possible and preferably not greater than 10 microns.

If stabilization of the emulsion is desired, about 0.001 to 0.1 percent, based on the emulsion, of a surfactant, such as hydrogenated castor oil ether can be added. For purposes of clarification, any surfactant is suitable provided it will not hemolyze the red blood cells or denature the hemoglobin contained therein.

In addition, certain colloidal materials meeting the above criteria may also be employed for stabilization purposes. Illustrative of these are dextran, polyvinyl alcohol, polyvinyl pyrrolidone, gelatin, etc.

The polyisocyanate is present in an amount $10^{-4}$–$10^{-1}$, preferably $10^{-3}$–$10^{-2}$, times the amount of the red blood cells present. Proportions may be varied depending on reaction time or temperature.

The spectroscopic absorption spectrum of the thus modified red cells, even in an oxidized reduced state is not changed from the original. They do not coagulate either in human serum or in artificial plasma. Red blood cells modified by the method of the present invention are free from hemolysis despite the fact that the size and shape thereof is substantially the same as that of natural red blood cells, while the latter is rapidly dissolved in distilled water.

Blood of any animal may be employed in the method of the present invention. Diluted whole blood may be fixed as is, but preferably, the red cells are recovered by centrifugal precipitation and washed with the isotonic saline solution prior to reaction with the polyisocyanate.

The polyisocyanate may be employed as a pure liquid or in the form of a solution in an organic solvent, which does not denature hemoglobin. Organic solvents suitable for use in dissolving the polyisocyanates are those which are not soluble with water and preferably, those having a solubility in water of less than 1 percent, having a low boiling point (below 150°C), and incapable of denaturing hemoglobin. Illustrative of such solvents are aromatic hydrocarbons, such as benzene, xylene or toluene and saturated aliphatic or cyclic hydrocarbons, such as n-hexane, n-heptane or n-octane and cyclohexane.

The amount of solvent required ranges from 1 to about 1000 times the amount of polyisocyanate and from 1/10 to 1/100 times the weight of the isotonic solution, which serves as the dispersion (emulsion) medium.

By way of further explanation, the red blood cell membrane as a whole, is composed of hydrophilic substances (e.g., protein or mucco saccharides); however, some lipid material is also present as well.

When a material, such as an organic solvent capable of passing through the red blood cell membrane ($CH_3OH$, $C_2H_5OH$, dioxane or tetrahydrofuran) comes into contact with the same, it readily passes through and adversely effects the hemoglobin therein, thus denaturing the red blood cell. See, GYENES, IMMUNOCHEMISTRY, Vol. 1, (April 1964) pp. 43–48, wherein the observance of browning of the red blood cells was noted.

However, when a substantially hydrophobic solvent is employed as contemplated by the present invention, penetration of the red blood cell membrane is inhibited and denaturing of the same is prevented.

Illustrative of suitable polyisocyanates are aliphatic, aromatic, aralkyl and heterocyclic bases having two or more isocyanate groups or isothiocyanate groups. Di- and tri-isocyanates are preferred. In particular, toluylene diisocyanate, hexamethylene diisocyanate and triphenylmethane triisocyanate are preferred.

As the dispersing medium for the red blood cells, it is necessary to select a medium that does not hemolyze red blood cells until they are reacted with the isocyanate. Isotonic or hypertonic solutions may be employed for red blood cells which are not hemolyzed thereby. Further, red blood cells may be pre-treated with dilute hydrogen peroxide to suppress hemolysis, but denaturing of hemoglobin often takes place as a result of such treatment.

The modified red blood cells of the present invention
exhibit reversible oxygen desorption under substantially the same conditions as intact red blood cells; and
with the aid of a $Cr^{51}$ tracer test, over a long period of time, considerable fractions of the modified red blood cells of the present invention were observed to be circulating in the body of test animals without adhering to the walls of the internal organs.

In addition, experiments have shown that the modified red blood cells of the present invention fail to exhibit agglutination. Though the explanation for this phenomena is not certain, it would appear that the presence of the polyisocyanate on the membrane of the red blood cell is in some way responsible.

The modified red blood cells of this invention can also be employed to determine the structure of the cell membrane thereof. That is, if the polyisocyanate is labelled with an isotope and employed, knowledge of where the polyisocyanate has been bonded on the cell membrane can be determined. From its reactivity, it can then be seen what the chemical structure of the cell membrane surface is.

Lastly, the modified red blood cells of the present invention may be used to examine blood flow. That is, today, much research is being conducted to determine, 1) how blood flows through narrow vessels without attendant decrease in blood pressure, 2) why blood flows without agglutination, 3) why thrombi form, and 4) how foreign matter is discriminated from normal red blood cells in an internal organ and removed thereby.

To date, hardened red blood cells, completely modified and hardened with formalin, glass balls, or plastic particles, have been employed. However, these materials are very different in terms of properties from natural blood cells. For example, they agglutinize on mixing with intact blood, or clog blood vessels and prove inoperable in "in vivo" tests In contrast thereto, since the modified red blood cells of the present invention simulate natural red blood cells, they permit an easy comparison between "in vitro" and "in vivo" tests.

The following examples are given in order to further illustrate the present invention; however, they are not intended to be limitative of the same.

EXAMPLE 1.

4g of human red blood cells recovered by centrifugal precipitation and washed twice with saline solution were dispersed in 100 g. of an 0.4 M saline solution to prepare a suspension of red blood cells. 6 ml of a 2 percent solution of toluylene diisocyanate in benzene was dispersed in 30 ml of water by the use of an ultrasonic emulsifier to prepare an isocyanate emulsion. The isocyanate emulsion was added to the suspension of red blood cells while stirring and cooling by ice water and subjected to centrifugal separation after 3 minutes to recover red blood cells possessing reinforced membranes. The resulting red blood cells were washed with saline solution (distilled water may be used) three times and mixed with ACD preservative solution (prepared by dissolving into 100 ml of distilled water, 0.4 g of citric acid, 1.32 g of sodium citrate, and 1.33 g of dextrose). Examined by microscope or spectroscopic absorption spectrum, the red blood cells were indistinguishable from natural red blood cells.

EXAMPLE 2.

An aqueous 0.15 M saline solution containing 5 percent of polyvinyl alcohol was provided. In 400 g of the aqueous solution there was dispersed 10 g of goat red blood cells to prepare a suspension of red blood cells and the same was cooled to 10°C. 30 ml of a 1.5 percent solution of triphenylmethane triisocyanate in benzene was emulsified in 100 g of the saline solution by means of an ultrasonic emulsifier to prepare an isocyanate emulsion. These were mixed while stirring and, after 5 minutes, subjected to centrifugal separation and washing with water to give modified goat red blood cells having a particle size of 4–5 microns.

EXAMPLE 3.

5g of cattle red blood cells were dispersed in 300 g of an 0.2 M saline solution containing 5 percent of polyvinyl alcohol. 4 percent of toluylene diisocyanate was dissolved in a mixed solution of benzene and ether (4.1). While stirring vigorously at ambient temperatures, 40 ml of the isocyanate solution was added thereto all at once, and, after 8 minutes, subjected to centrifugal separation. The modified red blood cells were recovered and washed with water.

EXAMPLE 4.

The procedure of Example 2 was followed except that Co*treated red blood cells, obtained by bubbling CO through the goat blood to substantially convert the hemoglobin into an addition compound were used in place of the goat red blood cells. After modification, the CO was released in a vacuum and exchanged for oxygen to provide normal hemoglobin.

* carbon monoxide

EXAMPLE 5.

The procedure of Example 2 was followed, except that the suspension of red blood cells and the isocyanate emulsion were mixed and, after 3 minutes, immediately subjected to centrifugal separation to collect the red blood cells. The thus recovered red cell dispersion was mixed with a solution of 0.5 g of glutathione in 5 ml of water. The resulting mixture was subjected to centrifugal separation, recovered and washed with water to obtain modified goat red blood cells.

EXAMPLE 6.

In 200 g of saline solution was dispersed 10 g of pig red blood cells and cooled to 2°C. An isocyanate emulsion was prepared by mixing 0.15 ml of toluylene diisocyanate with 30 g of saline solution using an ultrasonic emulsifier. These were mixed while stirring and after 3 minutes, were subjected to centrifugal separation and washed with saline solution to recover the modified red blood cells.

Although the present invention has been adequately described in the foregoing specification and Examples included therein, it is readily apparent that various changes and modifications can be made without departing from the spirit and scope thereof.

What is claimed is:

1. A method for modifying red blood cells by reinforcing the membranes thereof without denaturing their hemoglobin which comprises:

adding a polyisocyanate selected from the group consisting of toluylene diisocyanate and triphenylmethane triisocyanate in the form of an emulsion of said polyisocyanate in water to a saline suspension of red blood cells, said emulsion having been prepared at a temperature not exceeding 35°C., and within a period of time approximating 5 minutes; thereby producing said modified red blood cells characterized by reinforced membranes and hemoglobin resistent to denaturing; separating said modified red blood cells from the remainder of said saline suspension and collecting said modified red blood cells, said polyisocyanate being present in an amount of $10^{-4}$ to $10^{-1}$ times by weight of the red blood cells present.

2. The modified red blood cells produced by the method of claim 1.

3. The method of claim 1, wherein said polyisocyanate is toluylene diisocyanate.

4. The method of claim 1 wherein the polyisocyanate is triphenylmethane triisocyanate.

5. The method of claim 1, wherein the polyisocyanate is dissolved in a substantially hydrophobic organic solvent, immiscible with water prior to emulsification.

6. The method of claim 1, wherein said saline suspension of red blood cells is isotonic.

7. The method of claim 1, wherein said saline suspension of red blood cells is hypertonic.

8. The method of claim 1, wherein said polyisocyanate emulsion contains from 0.001 to 0.1% based on said emulsion of a suitable stabilizer.

9. The method of claim 1 wherein said separating is carried out by centrifuging.

* * * * *